United States Patent
Plagianos et al.

(10) Patent No.: US 10,710,699 B2
(45) Date of Patent: Jul. 14, 2020

(54) CONNECTION APPARATUS FOR IMPROVING THE CRASHWORTHINESS OF AIRCRAFT FLUID SYSTEMS

(71) Applicant: Bell Helicopter Textron, Inc., Fort Worth, TX (US)

(72) Inventors: Nicholas James Plagianos, North Richland Hills, TX (US); Martin Peryea, Southlake, TX (US); Stephen Dickison, North Richland Hills, TX (US); Michael Pujol, Dallas, TX (US); Robert Reynolds, Euless, TX (US)

(73) Assignee: Textron Innovations Inc., Providence, RI (US)

(*) Notice: Subject to any disclaimer, the term of this patent is extended or adjusted under 35 U.S.C. 154(b) by 598 days.

(21) Appl. No.: 15/267,581

(22) Filed: Sep. 16, 2016

(65) Prior Publication Data

US 2018/0079480 A1    Mar. 22, 2018

(51) Int. Cl.
| | |
|---|---|
| *B64D 37/32* | (2006.01) |
| *B64C 1/10* | (2006.01) |
| *B64D 37/08* | (2006.01) |
| *B64D 37/00* | (2006.01) |
| *B64D 37/06* | (2006.01) |

(52) U.S. Cl.
CPC .............. *B64C 1/10* (2013.01); *B64D 37/005* (2013.01); *B64D 37/06* (2013.01); *B64D 37/08* (2013.01); *B64D 37/32* (2013.01)

(58) Field of Classification Search
CPC ........ B64C 1/10; B64D 37/005; B64D 37/06; B64D 37/08; B64D 37/32; F16L 5/00; F16L 5/02; F16L 5/08; F16L 5/10; F16L 5/14; F16L 11/00; B60K 15/01; B60K 2015/03125; B60K 2015/03144
See application file for complete search history.

(56) References Cited

U.S. PATENT DOCUMENTS

| | | | | |
|---|---|---|---|---|
| 1,015,180 A | * | 1/1912 | Heitman | ............... F16L 41/086 285/142.1 |
| 3,035,797 A | * | 5/1962 | Neuschotz | ............. B64D 37/04 137/572 |
| 4,307,744 A | * | 12/1981 | Marrison | ................ F16K 17/40 137/572 |

(Continued)

OTHER PUBLICATIONS

European Search Report in related European Patent Application No. 16196094.3; dated May 16, 2017; 4 pages.

(Continued)

*Primary Examiner* — Richard R. Green
*Assistant Examiner* — Michael A. Fabula
(74) *Attorney, Agent, or Firm* — Lightfoot & Alford PLLC (57) ABSTRACT

A fluid connection system for fluidly connecting a pair of fluid reservoirs, such as fuel cells, includes a bellowed portion surrounding a connection portion through which fluid can flow between the two reservoirs. The bellowed portion allows for relative movement between the two reservoirs without breaking the fluid-tight connection between the two reservoirs. Also, a guard member surrounds at least some of the outer periphery of the bellowed portion. The guard member serves as a shield around the fluid-tight connection and bellowed portion, and thereby helps prevent damage to the fluid-tight connection in the event of a crash or hard landing.

16 Claims, 7 Drawing Sheets

(56) References Cited

U.S. PATENT DOCUMENTS

| | | | | |
|---|---|---|---|---|
| 4,323,094 A * | 4/1982 | Paulis | ................... | B64D 37/16 |
| | | | | 137/614.03 |
| 4,335,905 A * | 6/1982 | Bac | ....................... | B65D 88/54 |
| | | | | 285/136.1 |
| 5,067,690 A * | 11/1991 | Bac | ..................... | B60K 15/063 |
| | | | | 137/38 |
| 7,195,285 B2 * | 3/2007 | Rodousakis | ........... | B64D 37/06 |
| | | | | 220/23.4 |
| 7,464,966 B2 * | 12/2008 | Miyajima | ................. | F16L 5/10 |
| | | | | 285/124.3 |
| 9,404,610 B2 * | 8/2016 | Sannadi | ............... | B64D 37/005 |
| 2002/0074802 A1 * | 6/2002 | Feichtinger | ............ | B60K 15/04 |
| | | | | 285/415 |
| 2005/0178880 A1 * | 8/2005 | Howe | .................... | B64D 37/04 |
| | | | | 244/10 |
| 2013/0187374 A1 * | 7/2013 | Karlsson | ................ | F17C 1/002 |
| | | | | 285/47 |
| 2014/0050424 A1 * | 2/2014 | Hilsenrath | ............. | A47G 21/18 |
| | | | | 383/40 |
| 2015/0001843 A1 * | 1/2015 | Bornes | ................. | F16L 13/103 |
| | | | | 285/285.1 |
| 2015/0272358 A1 * | 10/2015 | Humphreys | ......... | B65D 47/063 |
| | | | | 220/254.1 |

OTHER PUBLICATIONS

Exam Report in related European Patent Application No. 16196094.3; dated Jun. 6, 2017; 6 pages.

* cited by examiner

CONNECTION APPARATUS FOR IMPROVING THE CRASHWORTHINESS OF AIRCRAFT FLUID SYSTEMS

TECHNICAL FIELD

This disclosure generally relates to crash-resistant fluid systems, and more specifically relates to crashworthy connection systems for fluidly-connected enclosures, including crashworthy connection systems for fluidly-connected fuel cells.

BRIEF DESCRIPTION OF THE DRAWINGS

Embodiments are illustrated by way of example in the accompanying figures, in which like reference numbers indicate similar parts, and in which.

DETAILED DESCRIPTION

Some aircraft fluids (e.g., fuel, hydraulic fluid or other aircraft fluid) are transferred between components and systems through fluid transmission lines. In example implementations described here, the fluid transfer is through aircraft fuel transmission lines. However, in alternative embodiments, the fluid transfer can be through fluid transmission lines used to transport fuel and/or other fluids in other systems in which fluid is transported, e.g., automotive systems (e.g. automobiles, ATVs, motorcycles, etc.), fixed-wing aircraft, submersible systems, marine systems (e.g. personal watercraft, boats, etc.), agricultural systems (e.g. tractors, etc.), power equipment (e.g. generators, lawn mowers, pressure sprayers, etc.), systems that include gasoline engines, or other systems.

Figure 1:
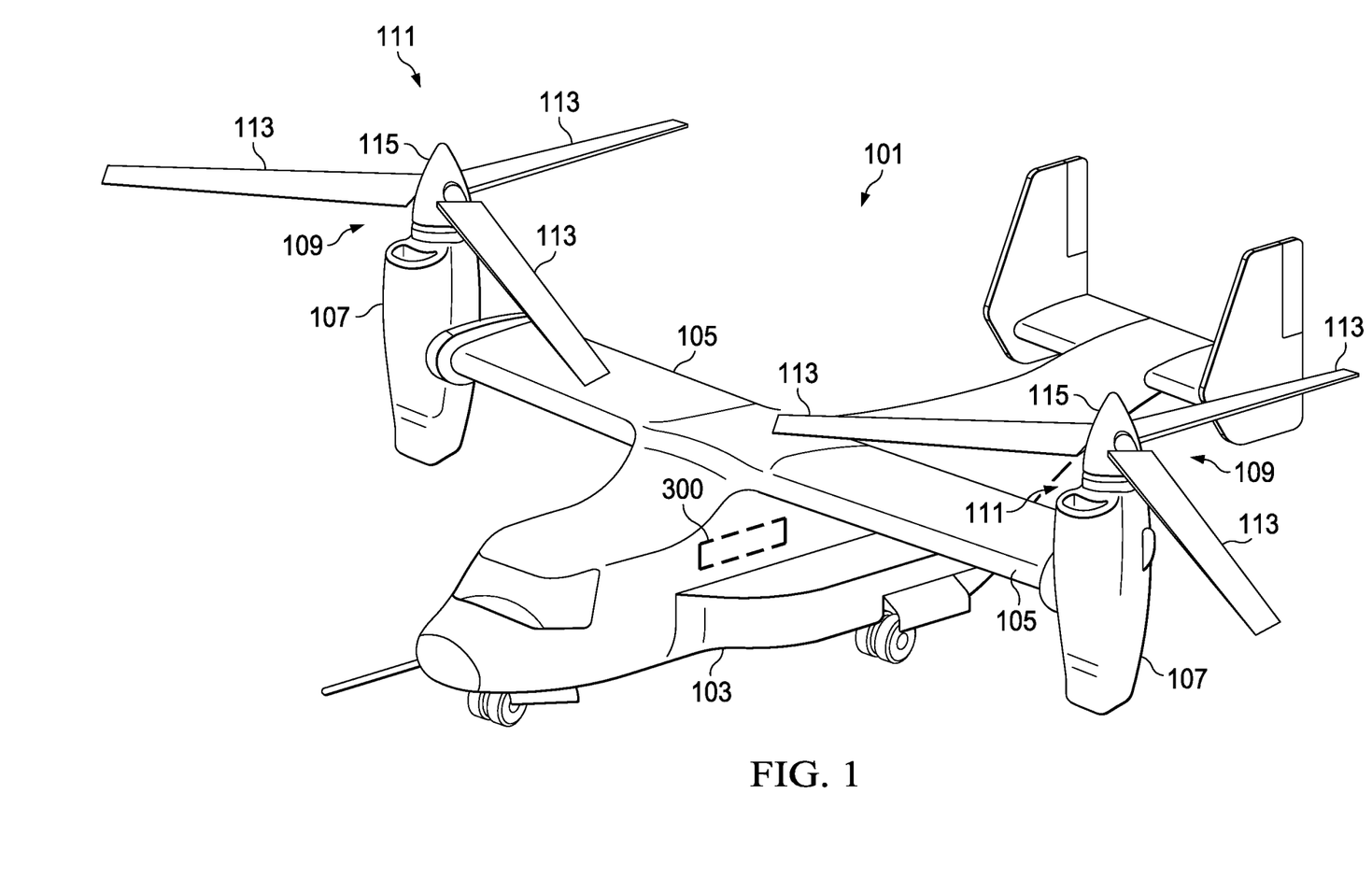
FIG. 1 shows a schematic diagram of an example of a tiltrotor aircraft.

FIG. 1 shows a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 can include a fuel storage system 300. The fuel storage system 300 can be located within the fuselage 103.

Figure 2:
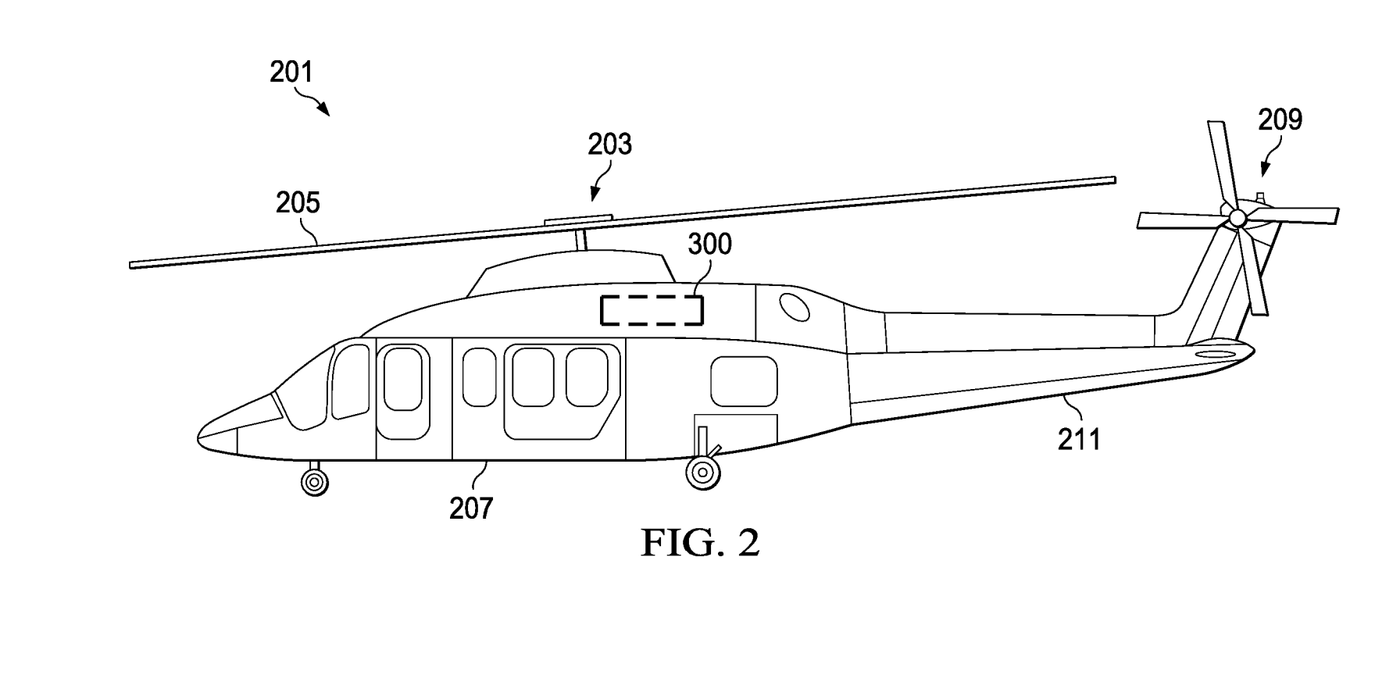
FIG. 2 shows a schematic diagram of an example of a rotorcraft.

FIG. 2 shows a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. Rotorcraft 201 can further include a fuselage 207, anti-torque system 209, and an empennage 211. The rotorcraft 201 can also include a fuel storage system 300. The fuel storage system 300 can be implemented in one or more fluid storage tanks, e.g., fuel cells, of the tiltrotor aircraft 101 or the rotorcraft 201 (or both), as described below.

Figure 3:
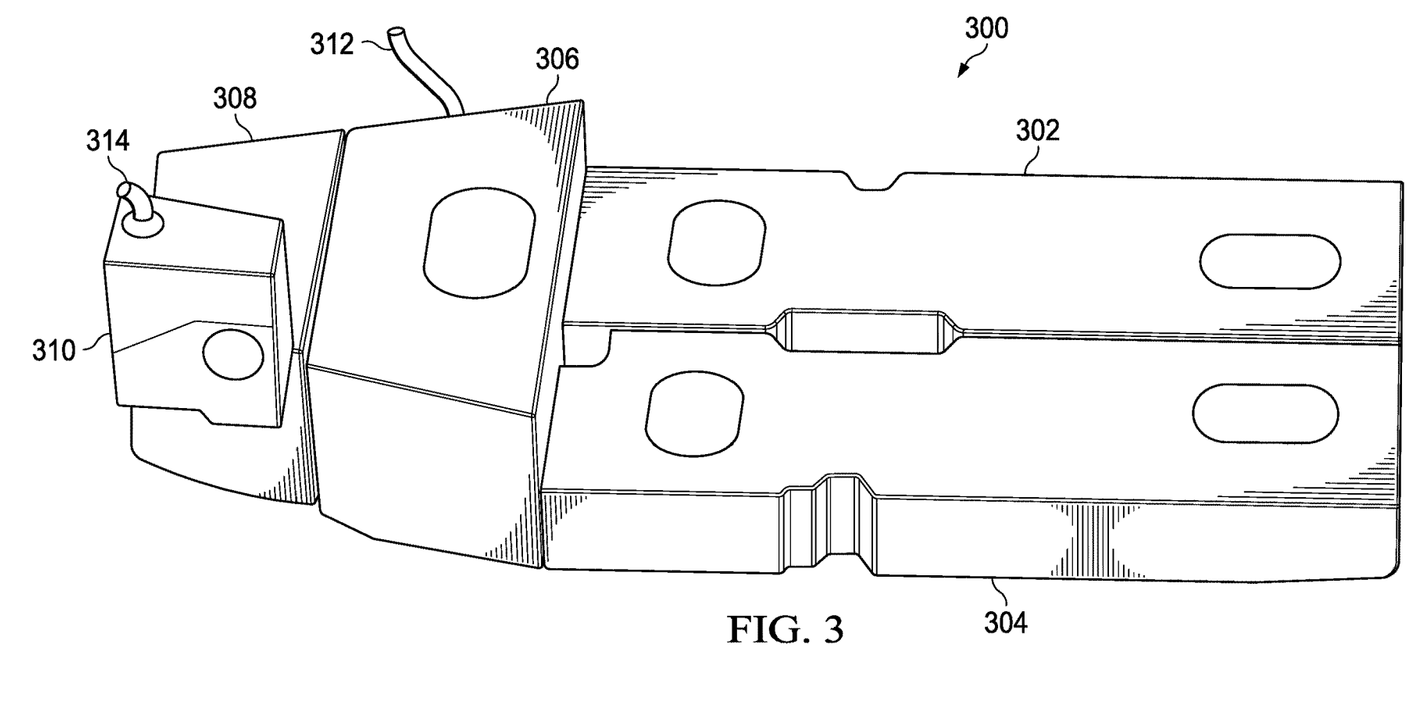
FIG. 3 shows a schematic diagram of a fuel storage system.

FIG. 3 shows a schematic diagram of an example fuel storage system 300. The fuel storage system 300 is typical of many different fuel systems that include multiple fuel cells that are fluidly connected to each other. The fuel storage system 300 includes a forward port fuel cell 302, a forward starboard fuel cell 304, a center fuel cell 306, an aft fuel cell 308, and an expansion tank 310. The fuel storage system 300 can also include additional components, such as a fuel supply line 312 and a vent line 314. The fuel cells 302, 304, 306, 308, and expansion tank 310 can include fuel storage bladders formed of a strong material that is suitable for storing fuel without allowing the fuel to seep therethrough. For example, Kevlar materials are known that can be suitably used to form the walls of a fuel bladder. Alternatively, fuel cells 302, 304, 306, 308, and expansion tank 310 can lack a separate fuel storage bladder and instead be provided with a fuel resistant coating on interior surfaces thereof such that the fuel cells 302, 304, 306, 308, and expansion tank 310 can store fuel without a bladder.

Figure 4:
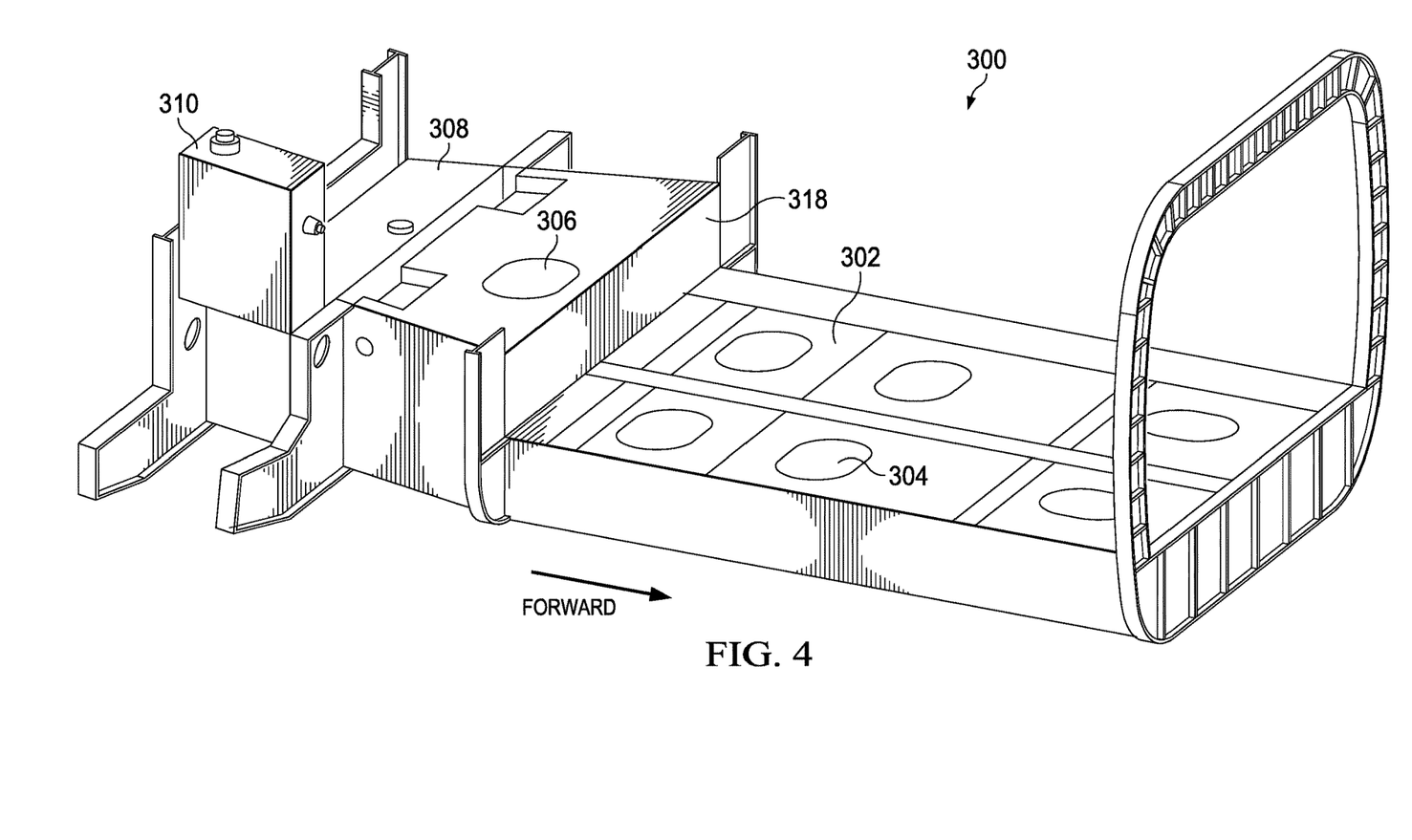
FIG. 4 shows the fuel storage system shown in FIG. 3 with portions of an airframe.

FIG. 4 shows another schematic diagram of the fuel storage system 300 shown in FIG. 3, along with portions of an airframe. As shown in FIG. 4, the airframe includes several bulkheads, including bulkhead 318. Some of the bulkheads may interpose two or more fluidly-connected fuel cells. For example, bulkhead 318 interposes fuel cells 302 and 306. A hole 344 can be provided in the bulkhead 318 to serve as a passage for a fluid connection between the fuel cells 302 and 306. However, in the event of a crash or hard landing, there may be relative motion between the bulkhead 318 and the fluid connection between the fuel cells 302 and 306. This relative motion can cause the bulkhead 318 to puncture or sever the fluid connection between the fuel cells 302 and 306, which can result in a loss of fuel and a fire hazard. It is therefore desirable to provide a fluid connection between the various fuel cells that is resistant to damage from other parts of an aircraft, including the airframe and bulkheads, in the event of a hard landing or a crash.

Figure 5:
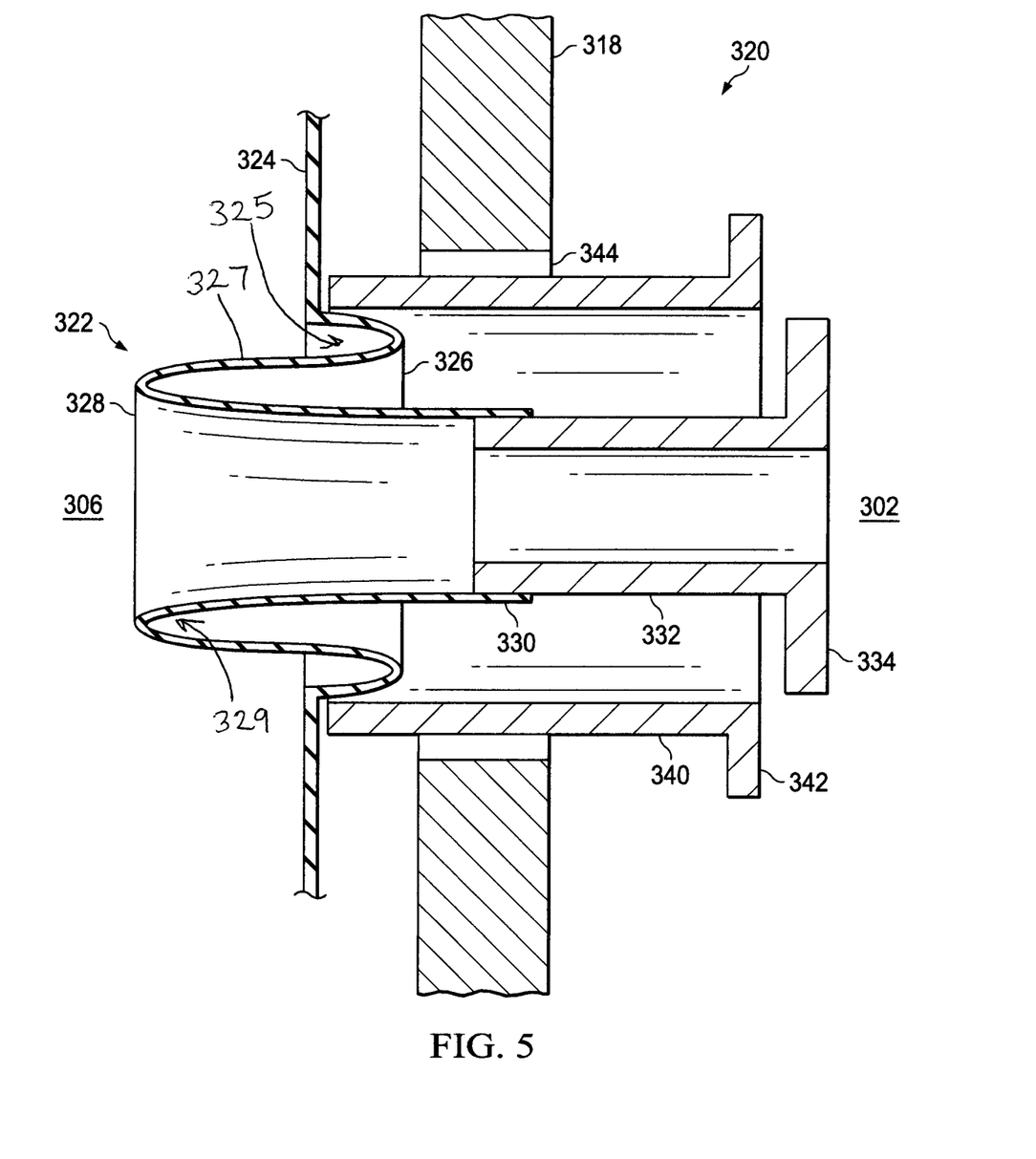
FIG. 5 shows a cross-sectional view of a first embodiment of a fluid connection system according to the present disclosure.

FIG. 5 shows a cross-sectional view of a first embodiment of a fluid connection system 320 according to the present disclosure. The fluid connection system 320 is shown connecting fuel cells 302 and 306 through bulkhead 318. The fluid connection system 320 includes a bellowed portion 322 that is integral to the bladder 324 of the fuel cell 306. The bellowed portion 322 includes at least one crest portion 326 that extends outwardly from the fuel cell 306, adjoining at least one root portion 328 that extends inwardly into the fuel cell 306, in turn adjoining a connection portion 330. Alternative embodiments can include additional crest portions 326 and root portions 328, alternating in series with each other. In this embodiment, the bellowed portion 322 comprises an outer pleat 325 and an inner pleat 329. An intermediate portion 327 forms a portion of each of the outer pleat 325 and the inner pleat 329.

The connection portion 330 is attached to a fitting 332 such that a fluid-tight fluid path is formed between the fuel cells 302 and 306. In the illustrated embodiment, the fitting 332 includes a cylindrical portion thereof that is attached to the connection portion 330; however, in alternative embodiments, the cylindrical portion of the fitting 332 can alternatively have other non-cylindrical shapes, such as any of a variety of multi-faceted shapes that have polygonal cross-sections. The connection portion 330 can be connected to the fitting 332 a variety of ways, such as with the use of adhesives and/or hardware, for example a hose clamp or the like.

The fitting 332 is connected to the bladder 334 of the fuel cell 302. The fitting 332 can be integral to the bladder 334 or can be attached to the bladder 334 using adhesives and/or connection hardware.

In the event of a crash or hard landing, the fuel cells 302 and 306 may be subject to forces that cause them to move relative to each other. The bellowed portion 322 allows for such relative motion without breaking the fluid-tight fluid connection between the two fuel cells 302 and 306. For example, the bellowed portion 322 allows the fuel cells 302 and 306 to move towards and away from each other, and to move laterally (in and out of the drawing) and elevationally (up and down in the drawing) relative to each other, as well as combinations of those directions of relative movement, while still maintaining a fluid-tight fluid connection between the fuel cells 302 and 306.

The connection system 320 further includes a guard member 340. The guard member 340 can be generally cylindrical in shape as shown or can have other shapes, such as any of a variety of multi-faceted shapes that have polygonal cross-sections. The guard member 340 can optionally include a flanged portion 342. The guard member 340 surrounds at least a portion of the bellowed portion 322 and at least a portion of the fitting 332. More specifically, the guard member 340 surrounds at least a portion of the crest portion 326 and connection portion 330 of the bladder 324, as well as a portion of the fitting 332. Significantly, the guard member 340 extends through the hole 344 in the bulkhead 318, and thereby interposes the bulkhead 318 and the fluid connection between the fuel cells 302 and 306.

In the event of a crash or hard landing, the fuel cells 302 and 306 may be subject to forces that cause them to move relative to each other and relative to the bulkhead 318. As a result, without the guard member 340, the various components that form the fluid connection between the fuel cells 302 and 306 (i.e., the bellowed portion 322 and the fitting 332) could be punctured, severed, or otherwise damaged by the bulkhead 318 or other debris. Therefore, the guard member 340 is provided in order to help prevent the bulkhead 318 from damaging the bellowed portion 322 and/or the fitting 332 in the event of a crash or hard landing. Preferably the guard member 340 is therefore formed of a material that is highly resistant to compressive and shearing forces, such as metal, composite, or acrylic material.

Figure 6:
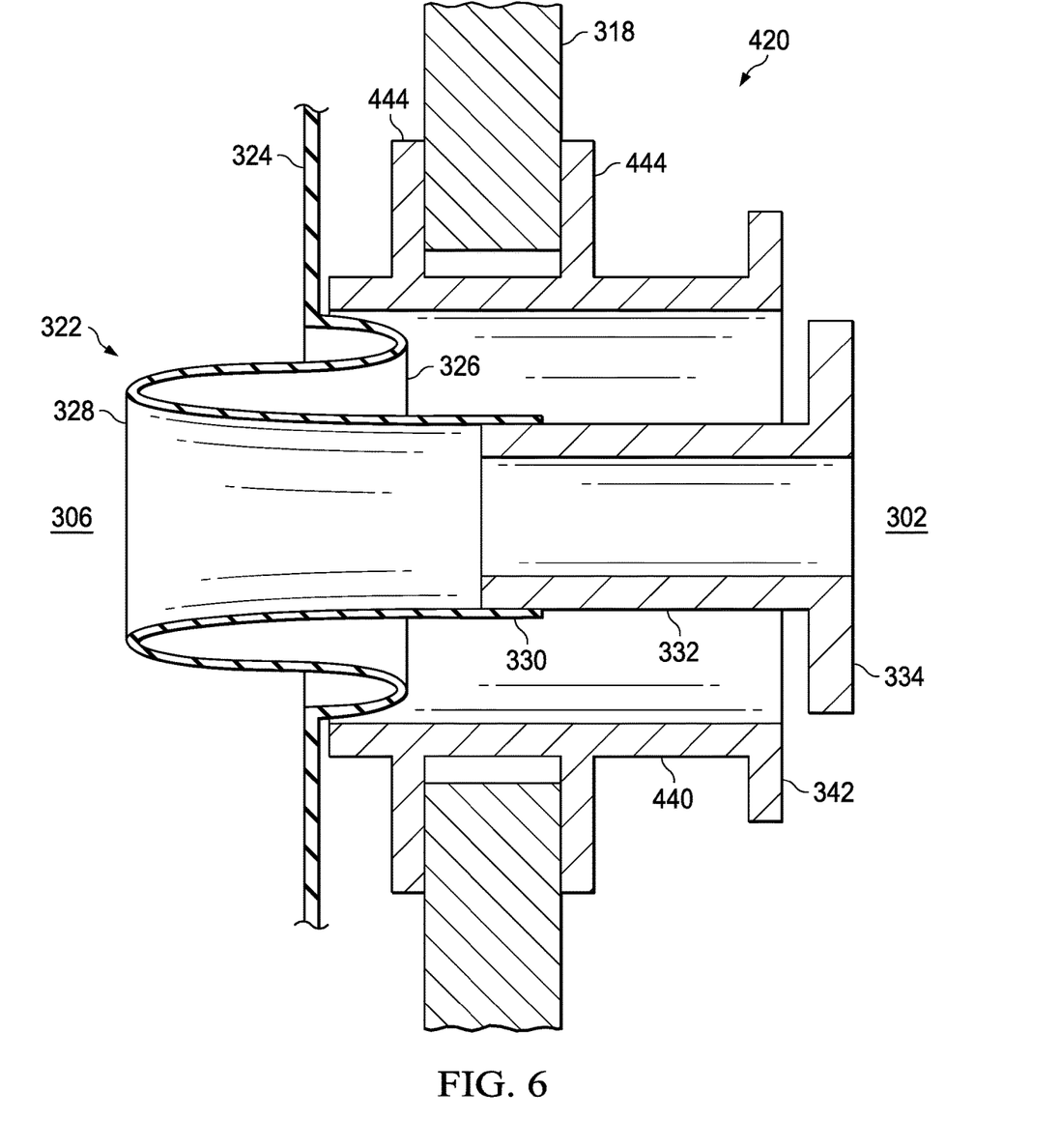
FIG. 6 shows a cross-sectional view of a second embodiment of a fluid connection system according to the present disclosure.

FIG. 6 shows a cross-sectional view of a second embodiment of a fluid connection system 420 according to the present disclosure. The second embodiment of the fluid connection system 420 is substantially the same as the first embodiment 320 shown in FIG. 5, except that the second embodiment of the fluid connection system 420 includes a guard member 440 in place of the guard member 340 shown in FIG. 5. The guard member 440 includes one or a pair of flange members 444 for attaching the guard member 440 to the bulkhead 318. The flange members 444 can be attached to the bulkhead 318 using adhesives and/or connection hardware, such as screws or nuts and bolts. While FIG. 6 shows flange members 444 on both sides of the bulkhead 318, alternative embodiments can include a flange member 444 on only one side of the bulkhead 318. In the second embodiment, since the guard member 440 is fixed to the bulkhead 318, the guard member 440 is more likely to stay fixed relative to the bulkhead 318 as compared to the first embodiment of the connection system 320 where the guard member 340 had more freedom to move laterally between the fuel cells 302 and 306.

Figure 7:
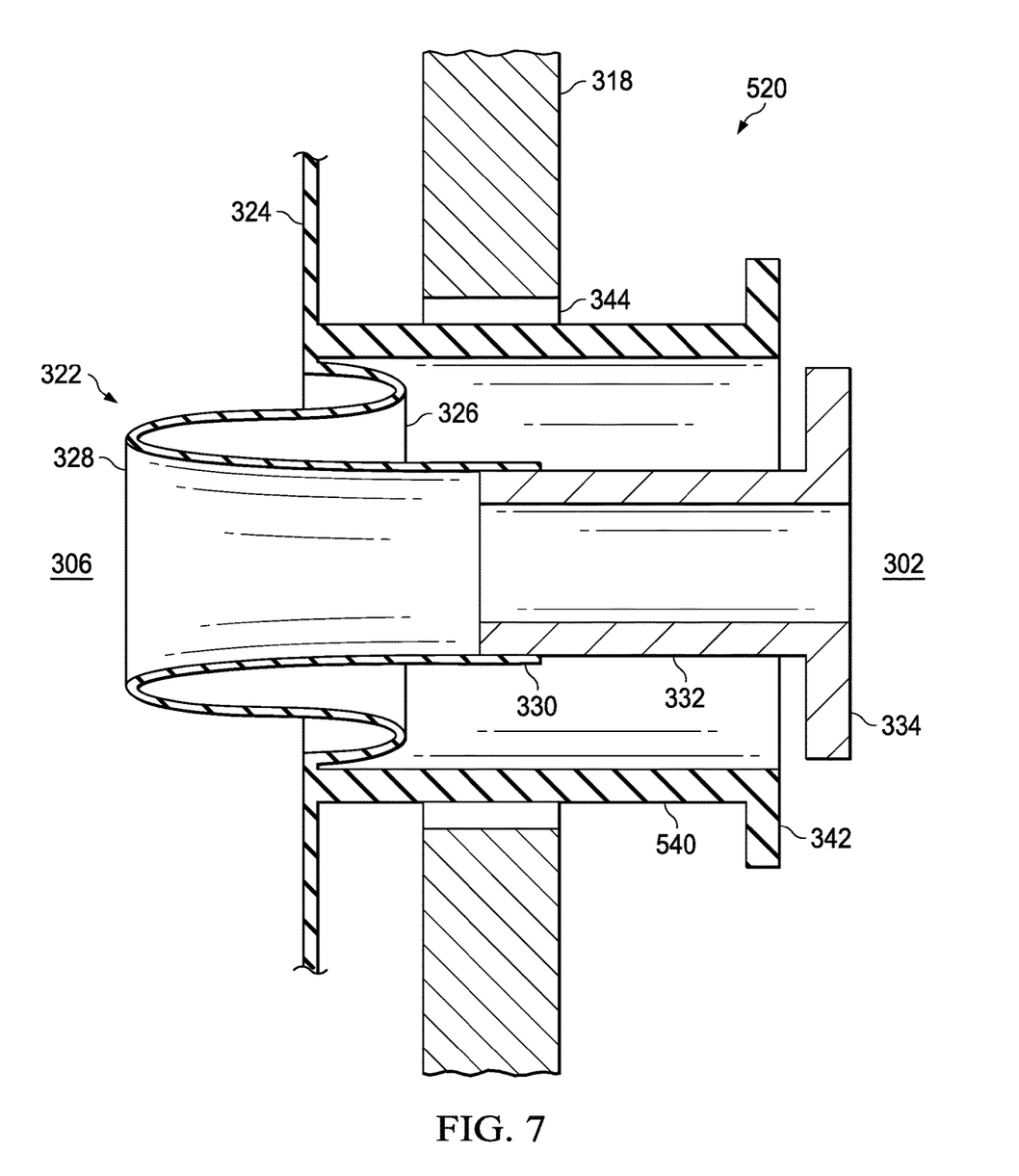
FIG. 7 shows a cross-sectional view of a third embodiment of a fluid connection system according to the present disclosure.

FIG. 7 shows a cross-sectional view of a third embodiment of a fluid connection system 520 according to the present disclosure. The third embodiment of the fluid connection system 520 is substantially the same as the first embodiment 320 shown in FIG. 5, except that the third embodiment of the fluid connection system 520 includes a guard member 540 in place of the guard member 340 shown in FIG. 5. The guard member 540 of the third embodiment is connected to one or both of the fuel bladders 324 and 334. In the illustrated embodiment, the guard member 540 is integrally formed with the fuel bladder 324. Alternatively, the guard member 540 can be attached to the fuel bladder 324, for example using adhesives, composite materials, and/or connection hardware, such as a hose clamp. The guard member 540 can alternatively be integral or attached to the fuel bladder 334. In the third embodiment, since the guard member 540 is fixed relative to one or both of the fuel bladders 324 and/or 334, the guard member 540 is more likely to stay fixed between the fuel cells 302 and 306, and therefore remain fixed relative to the bellowed portion 322 and fitting 332. This helps prevent the guard member 540 from being repositioned away from the components sought to be protected from the bulkhead 318 in the event of a crash or hard landing.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A fluid connection system comprising:
   a first bladder configured to store a fluid, the first bladder comprising a tubular bellowed portion comprising an outer pleat, an inner pleat, and an intermediate portion that forms a portion of each of the outer pleat and the inner pleat, wherein the outer pleat comprises a crest portion disposed at least partially outside the first bladder and wherein the inner pleat comprises a root portion disposed at least partially within the first bladder;
   a fitting connected to the inner pleat of the first bladder, the fitting and being connected so as to provide a fluid-tight path through which the fluid can travel to and from the first bladder; and
   a guard member extending about an outer periphery of at least a portion of each of the outer pleat, the intermediate portion, and the inner pleat.

2. The system of claim 1, wherein the guard member extends about the crest portion of the bellowed portion of the first bladder.

3. The system of claim 1, further comprising a second bladder, wherein the fitting is connected to the second bladder, and wherein the fluid-tight path is between the first and second bladders.

4. The system of claim 3, wherein the bellowed portion is configured to allow movement of the first and second bladders relative to each other while maintaining the fluid-tight path between the connection portion and the fitting.

5. The system of claim 3, wherein the guard member includes a portion thereof that extends between the first and second bladders.

6. The system of claim 1, wherein the guard member is attached to a bulkhead.

7. The system of claim 1, wherein the guard member is attached to the first bladder.

8. A fluid connection system for fluidly connecting a first fuel cell on a first side of a bulkhead to a second fuel cell on a second side of the bulkhead, the system comprising:
- a tubular bellowed portion of a first fuel bladder, the first fuel bladder being configured for retaining fuel within the first fuel cell, the bellowed portion comprising an outer pleat, an inner pleat, and an intermediate portion that forms a portion of each of the outer pleat and the inner pleat, wherein the outer pleat comprises a crest portion disposed at least partially outside the first fuel cell and wherein the inner pleat comprises a root portion disposed at least partially inside the first fuel cell;
- a fitting attached between the inner pleat and a second bladder, the second bladder being configured for retaining fuel within the second fuel cell,
- wherein the fitting provides a fluid path between the first and second bladders; and
- a guard member extending about an outer periphery of at least a portion of each of the outer pleat, the intermediate portion, and the inner pleat.

9. The system of claim 8, wherein the guard member extends about the crest portion of the bellowed portion of the first bladder.

10. The system of claim 8, wherein the guard member is attached to the bulkhead.

11. The system of claim 8, wherein the guard member is attached to the first bladder.

12. An aircraft comprising:
- an airframe having a bulkhead;
- first and second fuel cells on opposite sides of the bulkhead,
- wherein the first fuel cell includes a tubular bellowed portion thereof, the bellowed portion of the fuel cell comprising an outer pleat, an inner pleat, and an intermediate portion that forms a portion of each of the outer pleat and the inner pleat, wherein the outer pleat comprises a crest portion disposed at least partially outside the first fuel cell and wherein the inner pleat comprises a root portion disposed at least partially within the first fuel cell;
- a fitting connected between the second fuel cell and the inner pleat of the first fuel cell for providing a fluid connection the first and second fuel cells; and
- a guard member extending about an outer periphery of at least a portion of each of the outer pleat, the intermediate portion, and the inner pleat.

13. The aircraft of claim 12, wherein the guard member extends about the crest portion of the bellowed portion of the first bladder.

14. The aircraft of claim 12, wherein the guard member is attached to the bulkhead.

15. The aircraft of claim 12, wherein the guard member is attached to a first bladder, the first bladder being configured for retaining fuel within the first fuel cell.

16. The aircraft of claim 12, wherein the guard member includes a portion thereof that extends between the first and second fuel cells.

* * * * *